UNITED STATES PATENT OFFICE.

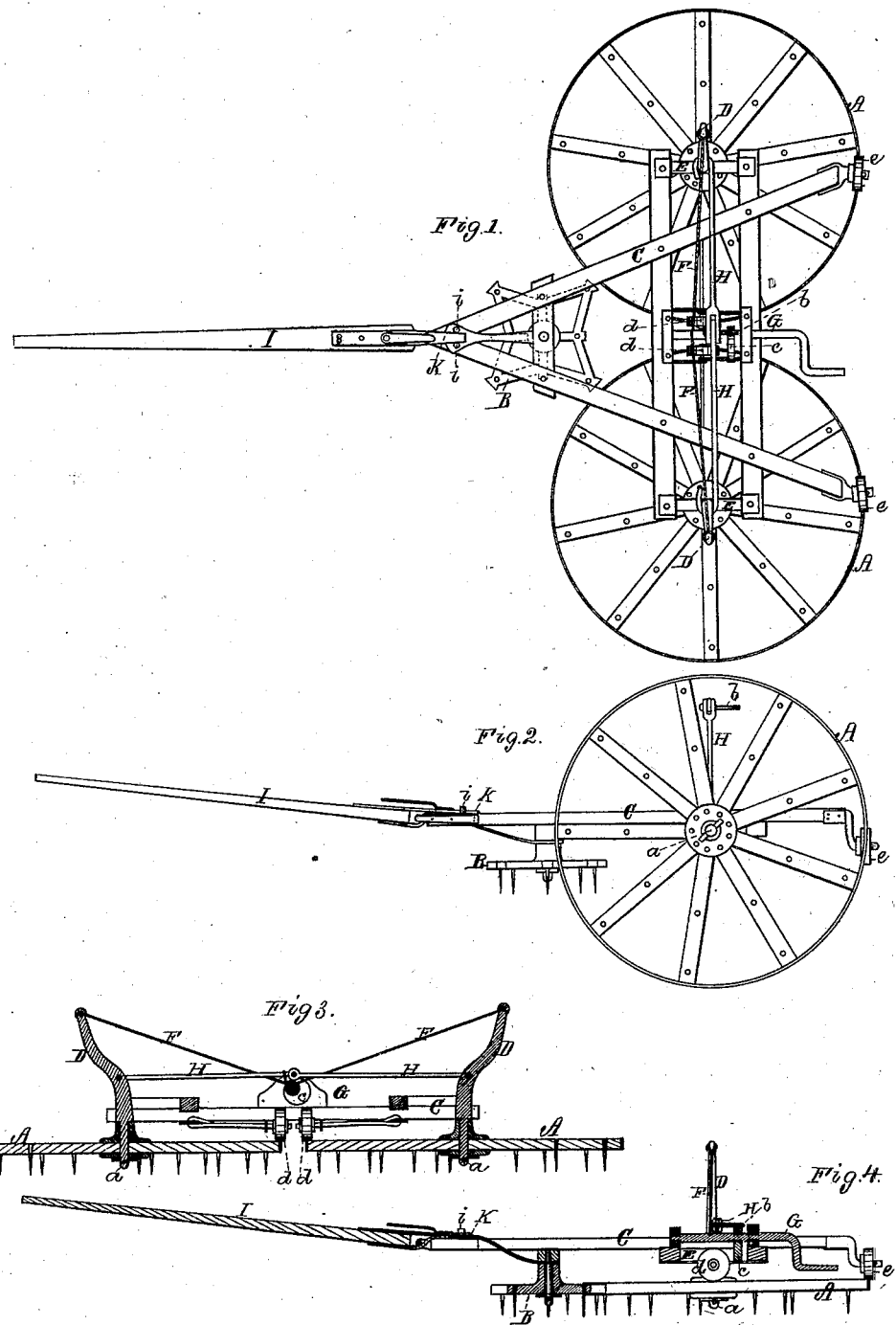

WALTER G. READ, OF COLUSA, CALIFORNIA.

IMPROVEMENT IN ROTARY HARROWS.

Specification forming part of Letters Patent No. 165,948, dated July 27, 1875; application filed June 1, 1875.

*To all whom it may concern:*

Be it known that I, WALTER G. READ, of Colusa, of the county of Colusa of the State of California, have invented certain new and useful Improvements in Rotary Harrows; and do hereby declare the same to be fully described in the following specification, and represented in the accompanying drawings.

My invention has reference to the kind of rotary harrow described in Letters Patent No. 157,542, dated December 8, 1874, and granted to me—that is, to a rotary harrow convertible into a truck, or from a truck to a rotary harrow, at pleasure.

Of the said drawings, Figure 1 is a top view, representing the harrow-wheels as in horizontal positions. Fig. 2 is a side elevation, showing the wheel in vertical positions. Fig. 3 is a transverse section, and Fig. 4 a longitudinal section, of the machine with the wheels in horizontal positions.

The said machine is provided with two main rotary-toothed wheels or harrows, A A, and one auxiliary one, B, arranged and combined with a supporting-frame, C, all being as represented. The journal $a$ of each of the main harrows constitutes the shorter arm of one of a pair of levers, D D, whose fulcrums or shafts are shown at E E. The longer arms of the said levers, by means of chains or ropes F F, are connected with a windlass or cranked shaft, G, arranged at the middle of the frame C, the same being to enable the wheels to be moved from horizontal up into vertical positions.

In carrying out my present invention I have combined with the two levers D D a pair of toggles or rods, H H, which at their inner ends are jointed together, and at their outer ones are pivoted to the longer arms of the said levers. The joint-pin $b$ of the toggles extends over and upon an eccentric, $c$, fixed on the shaft G. When the toggles are resting on the said shaft they serve to brace the wheel-levers so as to prevent the main harrows from tipping transversely of the machine out of their horizontal positions. On turning the shaft to wind up the chains or ropes F F the eccentric will force up the toggles into an angle with each other so as to enable them to be further moved by the wheel-levers. Besides the inner bearing-wheels $d\ d$ for sustaining the main harrow-wheels, or preventing them from tipping when horizontal, and easing them in revolving, I employ two other such wheels, $e\ e$, arranged at the rear ends of the frame, and to bear on the harrow in manner as shown. The tongue I, to which the draft animals are to be secured, besides being hinged to the harrow-frame so as to be capable of turning or being turned in various directions, has a short arm, K, extended back and upward from it, as shown. When the tongue is raised so as to force the arm down upon the frame C such arm will be between two bolt-heads or studs, $i\ i$, extending upward from the frame, whereby they and the arm will prevent the tongue from turning laterally independently of the harrow-frame.

From the above it will be seen that the tongue can readily be converted from a stiff to a limber tongue, as occasion may require, as the harrow-wheels are used either horizontally or vertically.

I prefer to have to each main harrow-wheel an odd number of spokes, as this I find to be advantageous in the operation of the teeth projecting down from them. The frame of the auxiliary rotary harrow I usually cast in one piece with the teeth to project from it.

I claim, in the above-described machine, as follows:

1. The jointed rods or toggles H H, arranged and combined with the rotary wheel-harrow-supporting levers D D and the windlass or shaft G, all being as and for the purpose as set forth.

2. The eccentric $c$, arranged and combined with the windlass or shaft G, and with the toggles H H applied to the levers D D, and having a joint-pin or projection to rest on the eccentric, as explained.

WALTER G. READ.

Witnesses:
FRANCIS B. READ,
JACOB BOWERS.